(12) United States Patent
Tsuchida et al.

(10) Patent No.: US 11,962,224 B2
(45) Date of Patent: Apr. 16, 2024

(54) ROTOR, MOTOR, FAN, AND ELECTRIC VACUUM CLEANER OR HAND DRYER

(71) Applicant: Mitsubishi Electric Corporation, Tokyo (JP)

(72) Inventors: Kazuchika Tsuchida, Tokyo (JP); Naoki Tamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 245 days.

(21) Appl. No.: 17/642,435

(22) PCT Filed: Nov. 14, 2019

(86) PCT No.: PCT/JP2019/044691
§ 371 (c)(1),
(2) Date: Mar. 11, 2022

(87) PCT Pub. No.: WO2021/095200
PCT Pub. Date: May 20, 2021

(65) Prior Publication Data
US 2022/0345005 A1 Oct. 27, 2022

(51) Int. Cl.
*H02K 7/04* (2006.01)
*H02K 7/08* (2006.01)
*H02K 7/14* (2006.01)

(52) U.S. Cl.
CPC ............... *H02K 7/04* (2013.01); *H02K 7/085* (2013.01); *H02K 7/14* (2013.01)

(58) Field of Classification Search
CPC ............ H02K 7/04; H02K 7/085; H02K 7/14; H02K 1/2733
See application file for complete search history.

(56) References Cited

U.S. PATENT DOCUMENTS 4,433,261 A * 2/1984 Nashiki .................. H02K 1/278
310/156.28
8,933,604 B2 * 1/2015 Lons ...................... H02K 15/12
310/43

(Continued)

FOREIGN PATENT DOCUMENTS

| JP | H02-046142 A | 2/1990 |
| JP | H04-183238 A | 6/1992 |

(Continued)

OTHER PUBLICATIONS

Office Action dated Nov. 22, 2022 in connection with counterpart Japanese Patent Application No. 2021-555720 (and English machine translation).

(Continued)

*Primary Examiner* — Dang D Le
(74) *Attorney, Agent, or Firm* — POSZ LAW GROUP, PLC

(57) ABSTRACT

A rotor includes a shaft extending in an axial direction, a cylindrical magnet portion provided at an outer peripheral portion of the shaft, a cylindrical scattering-prevention member provided so as to cover an outer peripheral surface of the magnet portion, a first balancing member provided at one end of the magnet portion in the axial direction, and a second balancing member provided at the other end of the magnet portion in the axial direction from which one end side of the shaft extends in the axial direction and having a diameter smaller than the inner diameter of the scattering-prevention member and the second balancing member has an end surface in contact with the magnet portion, the end surface being not surrounded by the scattering-prevention member.

14 Claims, 6 Drawing Sheets

(56) References Cited

U.S. PATENT DOCUMENTS

2012/0049661 A1 3/2012 Ions et al.
2020/0400157 A1 12/2020 Tsuchida et al.

FOREIGN PATENT DOCUMENTS

| JP | 2001-234927 A | 8/2001 |
| JP | 2012-050325 A | 3/2012 |
| JP | 2019-110680 A | 7/2019 |
| WO | 2008026268 A1 | 3/2008 |
| WO | 2019167153 A1 | 9/2019 |

OTHER PUBLICATIONS

International Search Report dated Jan. 21, 2020, issued in corresponding International Patent Application No. PCT/JP2019/044691 (and English Machine Translation).

* cited by examiner

//ROTOR, MOTOR, FAN, AND ELECTRIC VACUUM CLEANER OR HAND DRYER

CROSS REFERENCE TO RELATED APPLICATION

This Application is a U.S. National Stage Application of International Patent Application No. PCT/JP2019/044691, filed on Nov. 14, 2019, the disclosure of which is incorporated herein by reference.

TECHNICAL FIELD

The present disclosure relates to a rotor configured to include a permanent magnet, and also relates to a motor, a fan, and an electric vacuum cleaner or a hand dryer.

BACKGROUND

A motor speed increases in recent years, and it has become important to take measures against breakage of a magnet due to a strong centrifugal force acting on a rotor, and also against vibration caused by imbalance of the center of gravity due to misalignment between the center of gravity of the rotor and the center of a rotation shaft in a radial direction.

Conventionally, there is a measure to prevent fragments of the magnet from scattering even if the magnet is broken. A scattering-prevention member in the form of a thin-walled cylinder covering an outer peripheral surface of the magnet is attached to the rotor. As a measure against imbalance of the center of gravity, balance adjustment is performed to correct the imbalance of the center of gravity. The balance adjustment is performed by, for example, partially cutting a balancing member which is attached to an end surface of the magnet in advance.

As a method of fixing the scattering-prevention member to the rotor, there is a known method in which the scattering-prevention member is fixed to the balancing member by interference fit (for example, Patent Reference 1).

PATENT REFERENCE

Patent Reference 1: Japanese Patent Application Publication No. 2012-50325

However, in the rotor assembled as in the prior art reference, the scattering-prevention member covers a part of the balancing member, and thus a region of the balancing member that can be cut in the balance adjustment process after the assembly of the rotor decreases. Therefore, there is a possibility that balance adjustment cannot be performed. If the balancing member is thickened in order to increase the region that can be cut in the balance adjustment, the weight of the entire rotor increases, which makes it difficult to achieve downsizing and lightening of a main body of the motor.

SUMMARY

The present disclosure is made to solve the above-described problem, and is intended to provide a rotor facilitating balance adjustment thereof and contributing to downsizing and lightening of a motor.

A rotor according to the present disclosure includes a shaft extending in an axial direction, a cylindrical magnet portion provided at an outer peripheral portion of the shaft, a cylindrical scattering-prevention member provided so as to cover an outer peripheral surface of the magnet portion, a first balancing member provided at one end of the magnet portion in the axial direction, and a second balancing member provided at the other end of the magnet portion in the axial direction from which one end side of the shaft extends in the axial direction and having a diameter smaller than the inner diameter of the scattering-prevention member. The second balancing member has an end surface in contact with the magnet portion, the end surface being not surrounded by the scattering-prevention member.

A rotor according to the present disclosure includes a rotor includes a shaft extending in an axial direction, a cylindrical magnet portion provided at an outer peripheral portion of the shaft, a cylindrical scattering-prevention member provided so as to cover an outer peripheral surface of the magnet portion, a first balancing member provided at one end of the magnet portion in the axial direction and having a diameter larger than an inner diameter of the scattering-prevention member, a second balancing member provided at the other end of the magnet portion in the axial direction from which one end side of the shaft extends in the axial direction and having a diameter smaller than the inner diameter of the scattering-prevention member. A distance between an end surface of the first balancing member in contact with the magnet portion and an end surface of the second balancing member in contact with the magnet portion is larger than a length of the scattering-prevention member in the axial direction.

According to the rotor of the present disclosure, the entire side surface of at least the first balancing member is exposed without being covered with the scattering-prevention member, and thus a region of the balancing member to be machined is not limited. Therefore, balance adjustment of the rotor can be facilitated. Further, the balancing member can be configured to have a minimum thickness, and thus downsizing and lightening of the rotor can be achieved.

DETAILED DESCRIPTION

Hereinafter, rotors and motors according to embodiments will be described in detail with reference to the accompanying drawings.

First Embodiment

Figure 1:
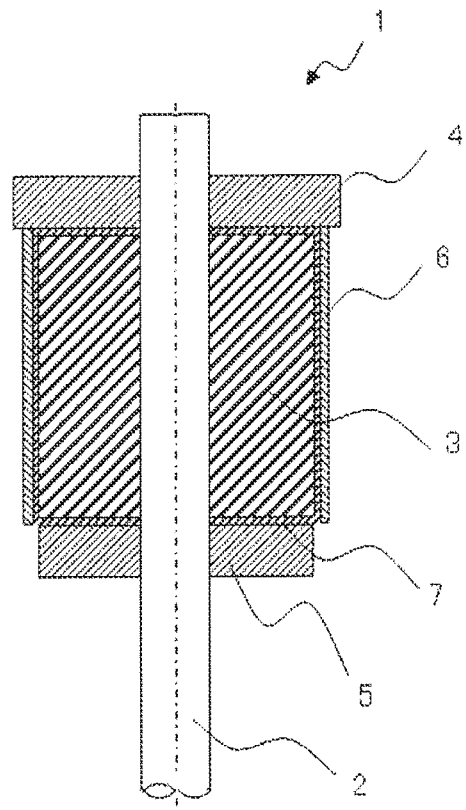
FIG. 1 is a sectional view of a rotor according to a first embodiment.

FIG. 1 is a sectional view of a rotor according to a first embodiment. As illustrated in FIG. 1, a rotor 1 includes a shaft 2 extending in an axial direction and a magnet portion 3 provided at an outer peripheral portion of the shaft 2. The rotor 1 includes a first balancing member 4 and a second balancing member 5 that are disposed to sandwich the magnet portion 3 from both sides in the axial direction, and a scattering-prevention member 6 covering an outer peripheral surface of the magnet portion 3. Gaps between the magnet portion 3 and each of the balancing members 4 and 5 and a gap between the scattering-prevention member 6 and the magnet portion 3 are filled with an adhesive agent 7.

The magnet portion 3 is a permanent magnet formed by molding a mixture of magnetic powder and resin into a cylindrical shape, and is configured so that N and S poles are alternately arranged in the circumferential direction. The magnet portion 3 only needs to be fixed so that the magnet portion 3 and the shaft 2 rotate together. Thus, the magnet portion 3 may be integrally formed with the shaft 2, or may be molded into a cylindrical shape and fixed to the shaft 2 by bonding or press-fitting.

The first and second balancing members 4 and 5 are disk-shaped members for correcting imbalance of the center of gravity of the rotor 1. The first and second balancing members 4 and 5 are made of brass, which is easy to machine, because the balancing members 4 and 5 are cut or ground in a balance adjustment process. Holes into which the shaft 2 is inserted are provided in centers of the first and second balancing members 4 and 5. The first and second balancing members 4 and 5 are fixed to the shaft 2 by press-fitting so that the first and second balancing members 4 and 5 do not move in the axial direction and in the circumferential direction relative to the shaft 2. The first and second balancing members 4 and 5 are fixed so that a small gap is formed between each of the first and second balancing members 4 and 5 and the corresponding end surface of the magnet portion 3 in the axial direction, and each gap is filled with the adhesive agent 7 so as not to form any clearance.

The scattering-prevention member 6 is a thin-walled circular tube made of stainless steel, which is a non-magnetic material, and is disposed to cover the outer peripheral surface of the magnet portion 3. The gap between the outer peripheral surface of the magnet portion 3 and the inner peripheral surface of the scattering-prevention member 6 is filled with the adhesive agent 7. A material for the scattering-prevention member 6 is required to be non-magnetic and have high strength. In this embodiment, the material for the scattering-prevention member 6 is stainless steel. Another suitable material is plastic reinforced with carbon fibers or glass fibers.

Figure 2A:
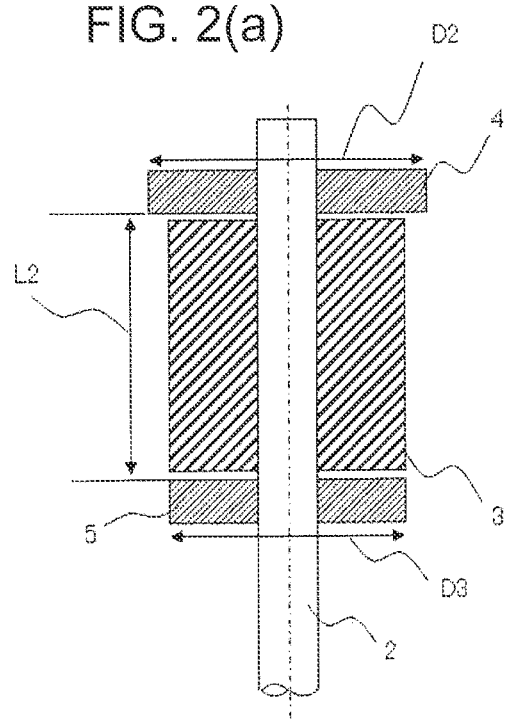
FIGS. 2(a) and 2(b) are exploded sectional views illustrating a dimensional relationship among members constituting the rotor according to the first embodiment.
Figure 2B:
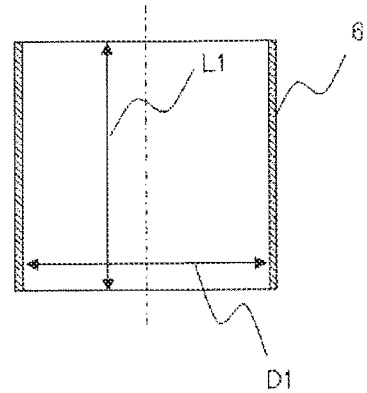

FIGS. 2(a) and 2(b) are exploded diagrams illustrating dimensions of the first and second balancing members 4 and 5 and the scattering-prevention member 6 which constitute the rotor 1, as well as a positional relationship among these members. FIG. 2(a) illustrates the rotor 1 in a state where the first and second balancing members 4 and 5 are press-fitted and fixed to the shaft 2 so that the first and second balancing members 4 and 5 sandwich the magnet portion 3 integrally molded with the shaft 2. FIG. 2(b) illustrates the scattering-prevention member 6 before assembly. The first balancing member 4 and the second balancing member 5 have end surfaces facing each other across the magnet portion 3 and contacting both ends of the magnet part 3 in the axial direction. A distance $L2$ between these end surfaces of the first balancing member 4 and the second balancing member 5 is larger than a length $L1$ of the scattering-prevention member 6 in the axial direction ($L2>L1$). An inner diameter $D1$ of the scattering-prevention member 6 is smaller than an outer diameter $D2$ of the first balancing member 4 ($D1<D2$) and larger than an outer diameter $D3$ of the second balancing member 5 ($D1>D3$).

In an assembly work of the rotor 1 with the above-described dimensional relationship, first, the first and second balancing members 4 and 5 are press-fitted and fixed to the shaft 2. Subsequently, the scattering-prevention member 6 is fitted to the magnet portion 3 from the second balancing member 5 side, and is fixed at a position where the scattering-prevention member 6 is in contact with the first balancing member 4. In such an assembly process, it is not necessary that the scattering-prevention member 6 is fitted to the magnet portion 3 in the press-fitting step of the first and second balancing members 4 and 5, and thus the assembly work can be facilitated.

The scattering-prevention member 6 fitted to the magnet portion 3 is brought into contact with the end surface of the first balancing member 4, and thus it is possible to determine a position of the scattering-prevention member 6 in the axial direction. That is, other positioning means are not needed, and thus the assembly work can be facilitated.

The length $L1$ of the scattering-prevention member 6 in the axial direction is smaller than the distance $L2$ between the first balancing member 4 and the second balancing member 5. Thus, the position in the axial direction of the scattering-prevention member 6 fixed so that its end surface is in contact with the end surface of the first balancing member 4 does not overlap with the positions in the axial direction of the first and second balancing members 4 and 5. Therefore, when balance adjustment of the rotor 1 is performed, the scattering-prevention member 6 does not interfere with the machining of the first and second balancing members 4 and 5. That is, the entire side surfaces of the first and second balancing members 4 and 5 are exposed, and thus each of the first and second balancing members 4 and 5 only needs to have a minimum thickness required for balance adjustment. Therefore, the weight and parts cost can be reduced.

As described above, in the rotor 1 according to the first embodiment, the position in the axial direction of the scattering-prevention member 6 covering the outer peripheral surface of the magnet portion 3 does not overlap with the positions in the axial direction of the first and second balancing members 4 and 5 disposed at the end surfaces of the magnet portion 3 in the axial direction. Thus, the machining for balance adjustment of the center of gravity of the rotor can be facilitated. Each of the first and second balancing members 4 and 5 can be configured to have the minimum thickness required for balance adjustment of the center of gravity of the rotor, and thus downsizing and lightening of the rotor can be achieved.

Second Embodiment

Figure 3:
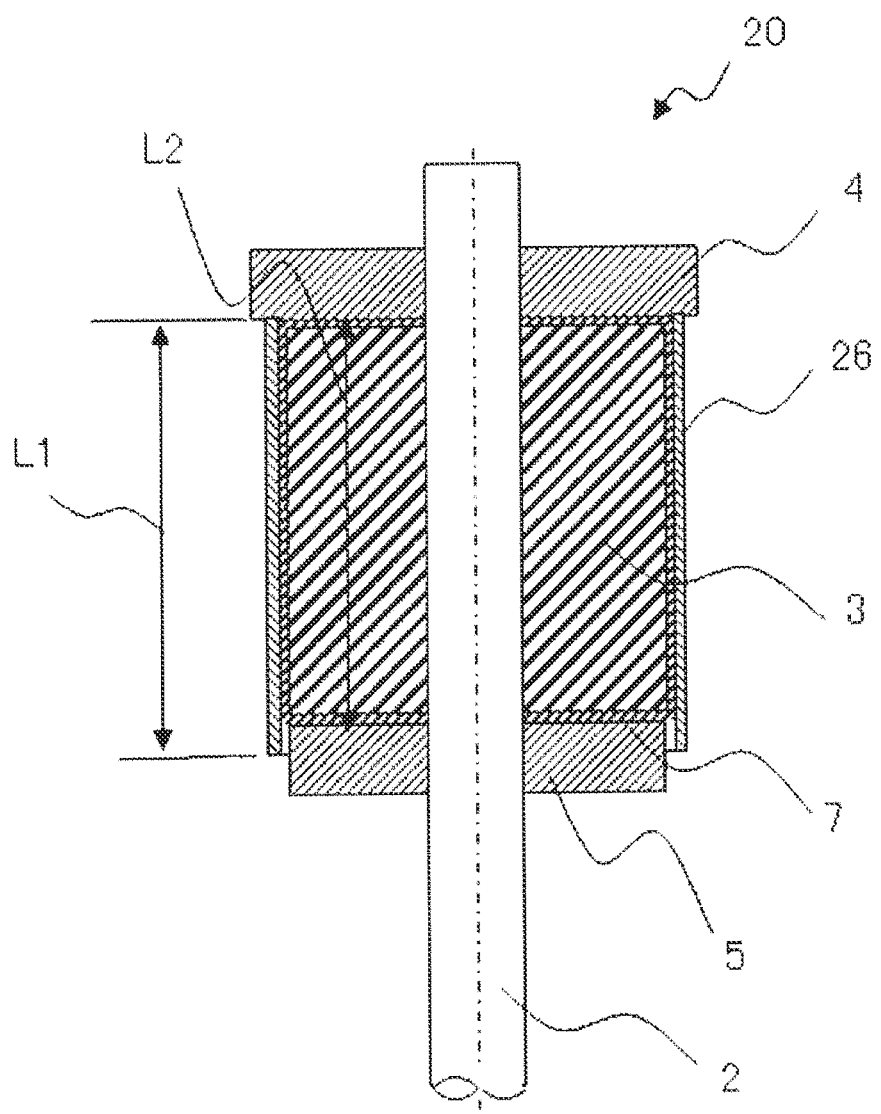
FIG. 3 is a sectional view of a rotor according to a second embodiment.

FIG. 3 is a sectional view of a rotor 20 according to a second embodiment. In the rotor 20, the length $L1$ of a scattering-prevention member 26 in the axial direction is larger than the distance $L2$ between the end surfaces of the first and second balancing members 4 and 5. Thus, this embodiment differs from the first embodiment in that a part of the side surface of the second balancing member 5 overlaps with the scattering-prevention member 26. Balance adjustment of the center of gravity of the rotor 20 configured in this way is performed by preferentially cutting the first balancing member 4.

As described above, in the rotor 20 according to the second embodiment, the positions in the axial direction of the first balancing member 4 and the scattering-prevention member 26 do not overlap with each other, and thus the same effects as those of the first embodiment are obtained. Since the scattering-prevention member 26 covers a part of the second balancing member 5, magnet fragments are prevented from scattering through a gap between the scattering-prevention member 26 and the second balancing member 5, even when the magnet portion 3 is broken. Thus, the reliability of the rotor 20 is improved.

Third Embodiment

Figure 4:
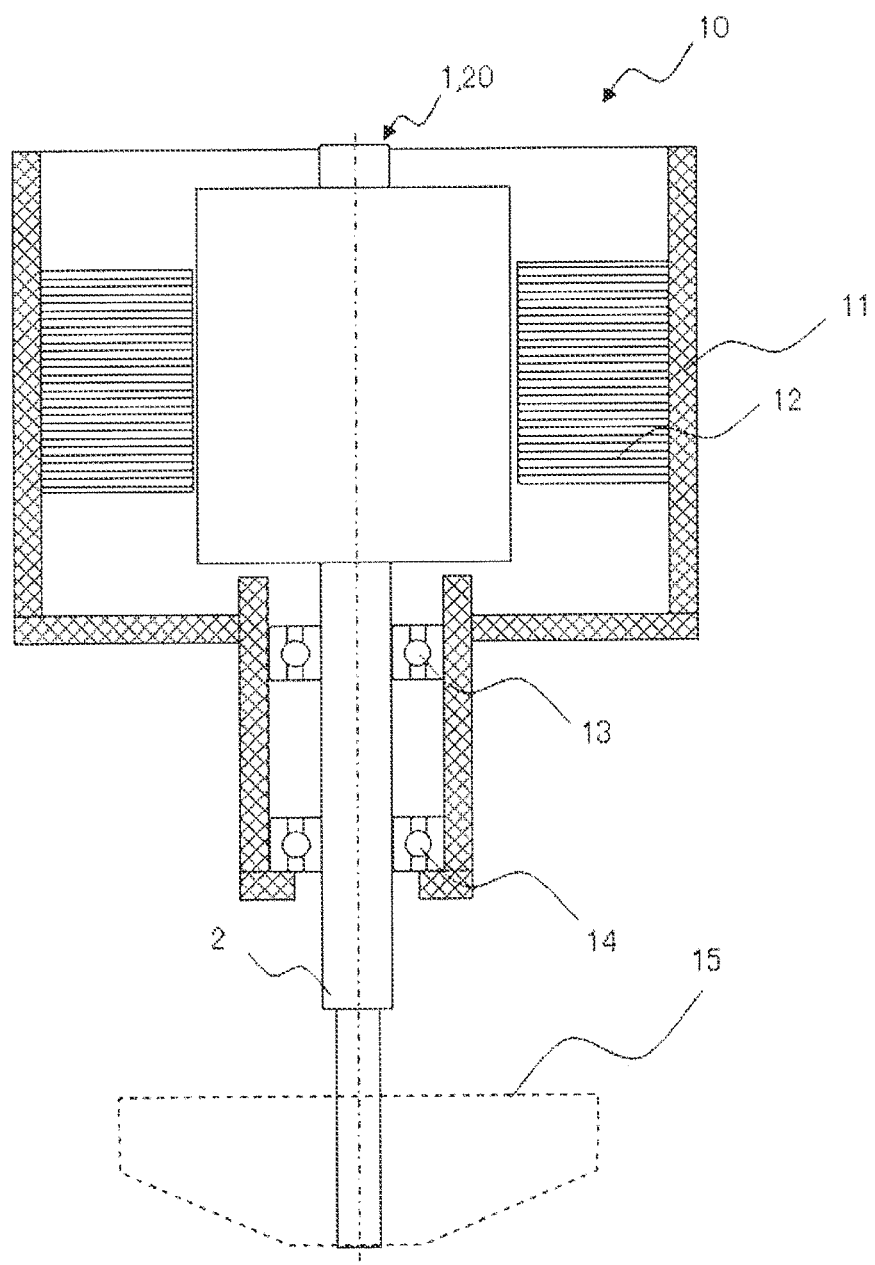
FIG. 4 is a sectional view illustrating an example of a motor using the rotor of the first or second embodiment.

Next, a third embodiment will be described with reference to FIG. 4. FIG. 4 is a sectional view of a motor 10 to which the rotor of the first or second embodiment is applied. The motor 10 is configured so that a stator 12 and first and second bearings 13 and 14 are fixed to a housing 11 forming an enclosure, while the shaft 2 of the rotor 1 protruding outward from the housing 11 is rotatably supported by the first and second bearings 13 and 14. The stator 12 is disposed so that a preset gap is formed between the stator 12 and an outer peripheral portion of the magnet portion 3. A rotational load portion 15 such as, for example, an impeller is attached to an end of the shaft 2 on the protruding side.

In the third embodiment, the first and second bearings 13 and 14 are disposed on one end side of the shaft 2 extending in the axial direction from the second balancing member 5. The first bearing 13 and the second bearing 14 are arranged in this order from the side closer to the second balancing member 5. The other end side of the shaft 2 serves as a free end to form a cantilevered shaft structure. However, the present disclosure is not limited to this arrangement. It is also possible to employ a both-ends-supported shaft structure in which the first bearing 13 is disposed on one end side of the shaft 2 while the second bearing 14 is disposed on the other end side of the shaft 2.

Figure 5:
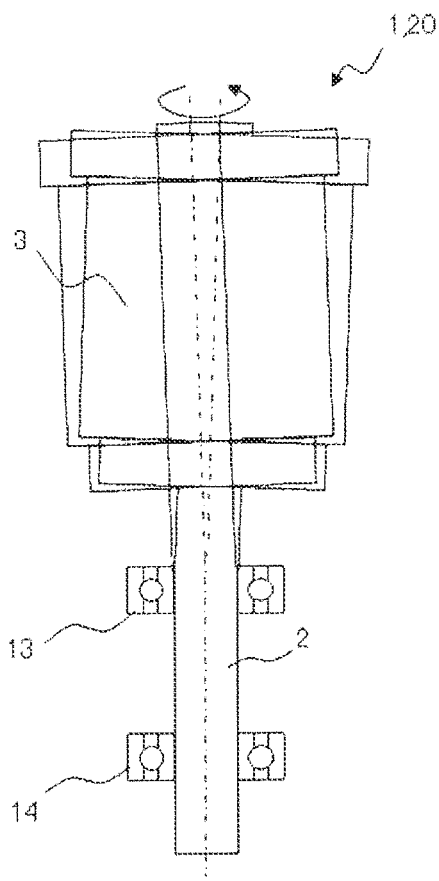
FIG. 5 is a schematic diagram illustrating a whirling motion of a motor in a third embodiment.

When a cantilevered shaft structure such as that of the third embodiment is employed, if there is any imbalance of the center of gravity in the rotor 1, a periodical displacement in the radial direction of the free end side of the shaft 2 may occur due to a centrifugal force generated during rotation. This is called a whirling motion. FIG. 5 is a schematic diagram of the whirling motion.

As a rotational speed at which the motor 10 is used increases, vibration of the whirling motion increases. Thus, during manufacturing of the rotors, each rotor is individually subjected to balance adjustment so as to reduce the imbalance of the center of gravity to an acceptable level or lower. In the balance adjustment, a mass balance in the radial direction is changed by, for example, partially cutting the first balancing member 4 or the second balancing member 5 attached to the end of the magnet portion 3. However, the imbalance of the center of gravity cannot be completely eliminated even when the balance adjustment is performed, and thus the whirling motion slightly occurs in practice.

The centrifugal force in the radial direction caused by the imbalance of the center of gravity generates a moment in a direction in which the shaft 2 supported by the first and second bearings 13 and 14 is tilted to its side. In the third embodiment, the distance between the first bearing 13 and the second bearing 14 is determined so that a sufficient reaction force against this moment is obtained.

Figure 6:
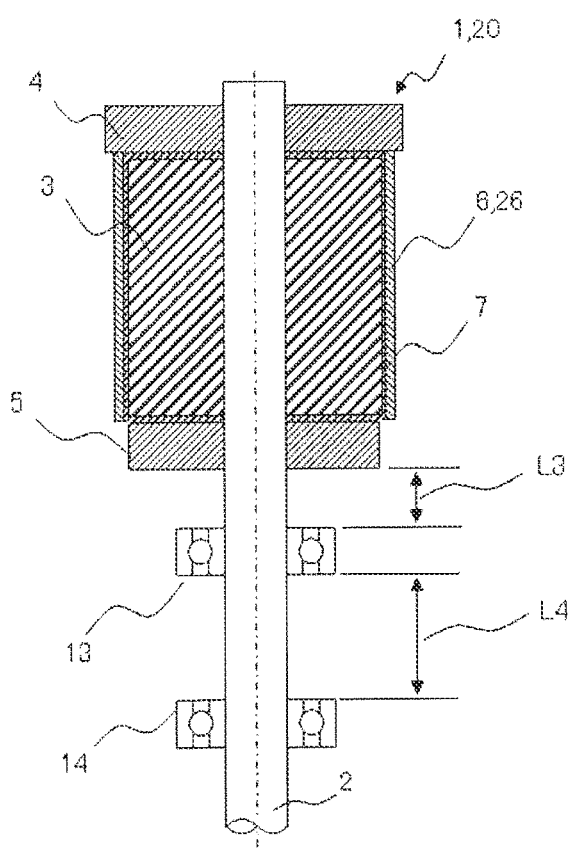
FIG. 6 is an arrangement diagram illustrating a positional relationship between bearings of the motor and a rotor in the third embodiment.

FIG. 6 is a diagram illustrating a positional relationship between the rotor 1 and each of the first and second bearings 13 and 14 in the axial direction. When L3 represents a distance between end surfaces of the first bearing 13 and the second balancing member 5 facing each other, and L4 represents a distance between end surfaces of the first and second bearings 13 and 14 facing each other, the first and second bearings 13 and 14 are disposed so that L4 is larger than L3 (L4>L3). When the motor 10 is configured to have such a positional relationship, the force supporting the shaft 2 increases, and the moment of the whirling motion acting to tilt the shaft can be offset. Thus, vibration due to the whirling motion can be suppressed.

When the whirling motion of the rotor 1 occurs, the rotor 1 is applied with a load by which the rotor 1 is pulled toward the free end in the axial direction. The load in the axial direction acts to cause a position of the center of gravity of the rotor 1 to move away from the first bearing 13 and thus causes an increase in the whirling motion. The scattering-prevention member 6 which is a part not fixed to the shaft 2 may be displaced in the axial direction when a holding force of the adhesive agent 7 decreases.

Figure 7:
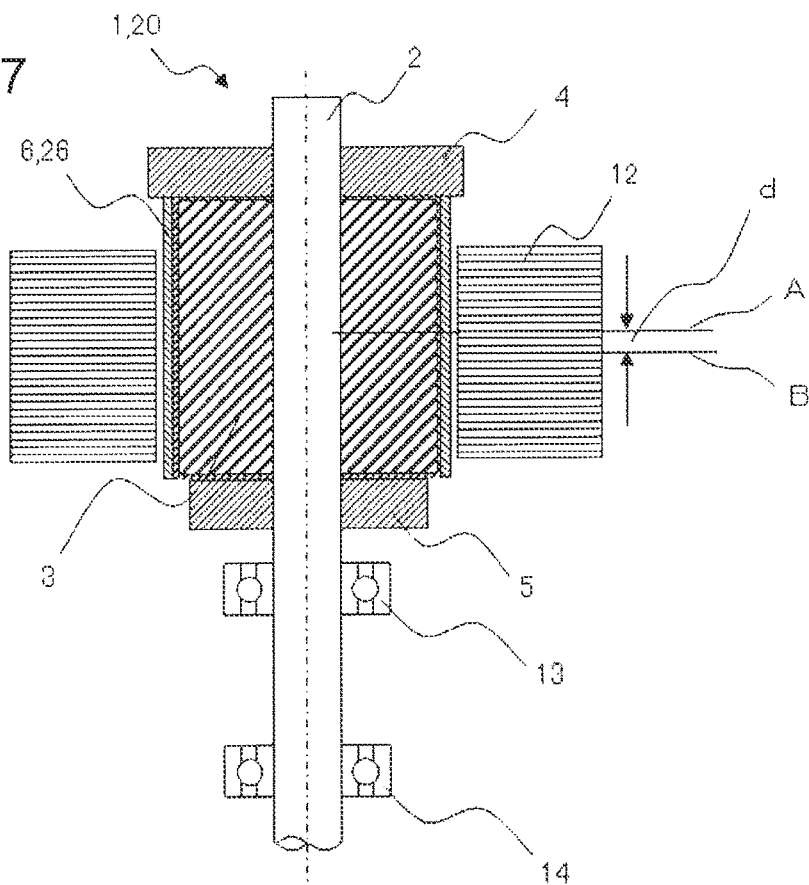
FIG. 7 is an arrangement diagram illustrating a positional relationship in an axial direction between the rotor and a stator of the motor according to the third embodiment.

FIG. 7 is a diagram illustrating a positional relationship between the rotor 1 and the stator 12. As illustrated in FIG. 7, when A indicates an intermediate point of the magnet portion 3 in the axial direction, while B indicates an intermediate point of the stator 12 in the axial direction, the stator 12 is disposed closer to the first bearing 13 by a distance d between the intermediate points A and B than the magnet portion 3 is to the first bearing 13. With this arrangement, the rotor 1 receives a magnetic attraction force from the stator 12 by which the rotor 1 is attracted in the direction toward the first bearing 13, as well as a magnetic force in the circumferential direction by which the rotor 1 is applied with a rotational torque. The magnetic attraction force acting in the axial direction offsets the load in the axial direction due to the whirling motion, and makes the center of gravity of the rotor 1 closer to the first bearing 13. Thus, the whirling motion can be suppressed.

In the third embodiment, the first balancing member 4, whose diameter is larger than the inner diameter of the scattering-prevention member 6, is disposed at the free end side of the whirling motion. Thus, even when the scattering-prevention member 6 receives the load in the axial direction due to the whirling motion, the movement of the scattering-prevention member 6 toward the free end side is restricted by the first balancing member 4. Thus, displacement of the scattering-prevention member 6 in the axial direction does not occur, and does not increase the imbalance of the center of gravity of the rotor. Thus, the reliability of the motor 10 can be enhanced.

Since the end surfaces of the first balancing member 4 and the scattering-prevention member 6 are in contact with each other, the position of the scattering-prevention member 6 in the axial direction can be determined without using any other positioning means, and the scattering-prevention member 6 does not move toward the first balancing member 4 side even when the scattering-prevention member 6 receives the load in the axial direction during rotation of the rotor 1.

Further, since the outer diameter of the second balancing member 5 is smaller than the inner diameter of the scattering-prevention member 6, the scattering-prevention member 6 can be fitted to the magnet portion 3 after the first and second balancing members 4 and 5 are press-fitted and fixed to the shaft 2. Thus, the assemblability of the rotor 1 can improved.

In the motor 10 according to the third embodiment, even when the cantilevered shaft structure is employed, the moment of the whirling motion acting to tilt the shaft 2 can be offset, and thus vibration due to the whirling motion can be suppressed. The scattering-prevention member 6 can be prevented from falling out due to the whirling motion.

The position of the rotor 1 with respect to the stator 12 in the axial direction is set so that the load in the axial direction due to the whirling motion can be offset by the magnetic attractive force, and thus it is possible to provide the motor 10 which vibrates little even when the motor 10 is used at a high speed.

Fourth Embodiment

Figure 8:
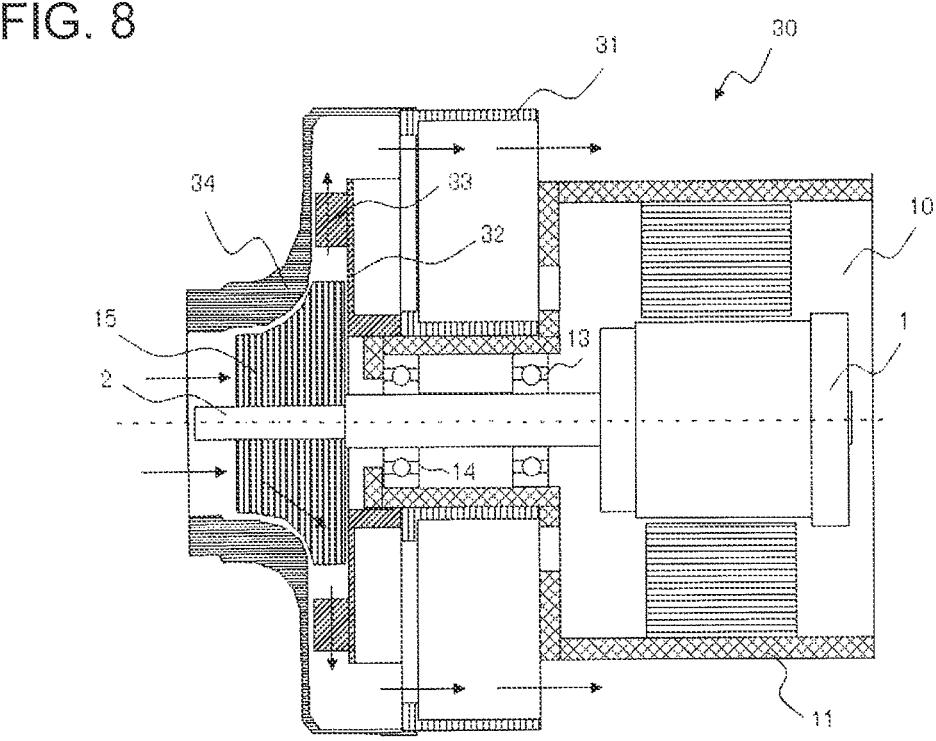
FIG. 8 is a sectional view of a fan according to a fourth embodiment.

FIG. 8 is a sectional view of a fan 30 according to a fourth embodiment. Any one of the first to third embodiments is applied to this fan. Arrows in FIG. 8 represent flows of air. The fan 30 includes the rotational load portion 15 that is a fan blade fixed to one end of the shaft 2 protruding from the motor 10 having the housing 11 as an enclosure, and a bracket 31 and a fan cover 34 that constitute a fan casing that forms an airflow path. The bracket 31 is fixed to the housing 11, and the fan cover 34 is fixed to cover the bracket 31 and the rotational load portion 15. A partition plate 32 integrally formed with a static blade 33 is provided in the airflow path formed between the bracket 31 and the fan cover 34.

Figure 9:
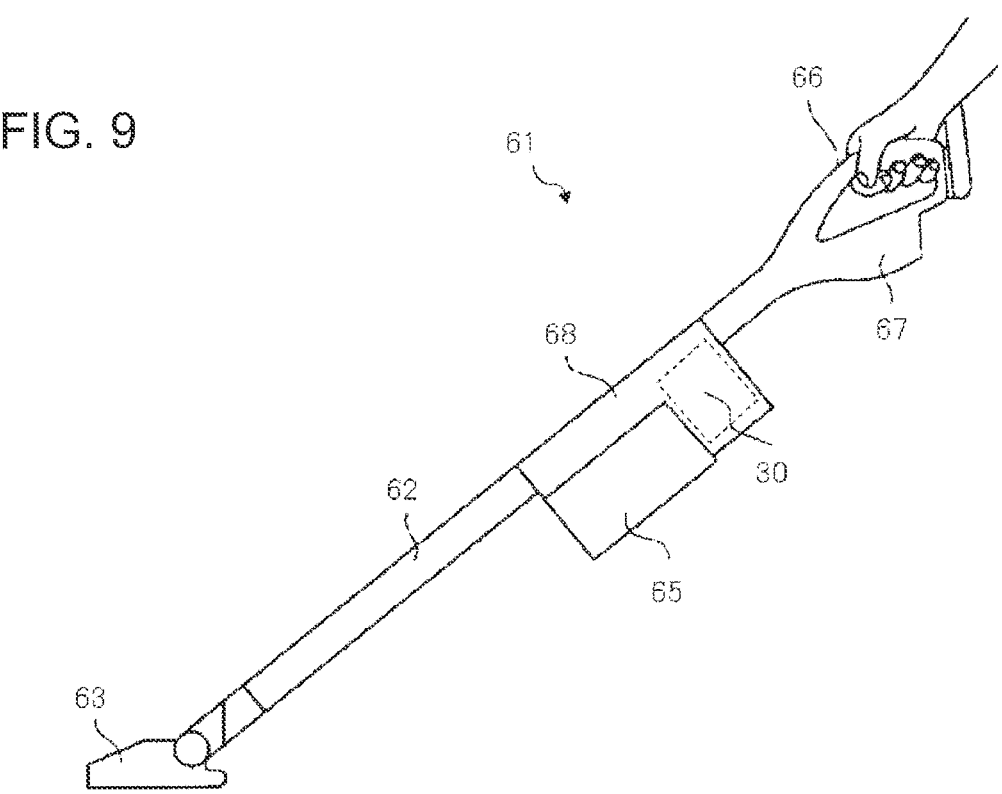
FIG. 9 is a schematic diagram illustrating an entire configuration of an electric vacuum cleaner using the fan according to the fourth embodiment.

Next, an application example of the fan 30 according to the fourth embodiment will be described. FIG. 9 is a diagram illustrating an example of a configuration of an electric vacuum cleaner 61 using the fan 30 according to the fourth embodiment. In FIG. 9, the electric vacuum cleaner 61 includes a battery 67, which is a DC power source, and the fan 30, and further includes a dust collection chamber 65, a sensor 68, a suction port body 63, an extension tube 62, and an operating portion 66. The electric vacuum cleaner 61 drives the fan 30 using the battery 67 as a power source and sucks in dust through the suction port body 63 and into the dust collection chamber 65 via the extension tube 62. When the electric vacuum cleaner 61 is used, the operating portion 66 is gripped and the electric vacuum cleaner 61 is operated.

Figure 10:
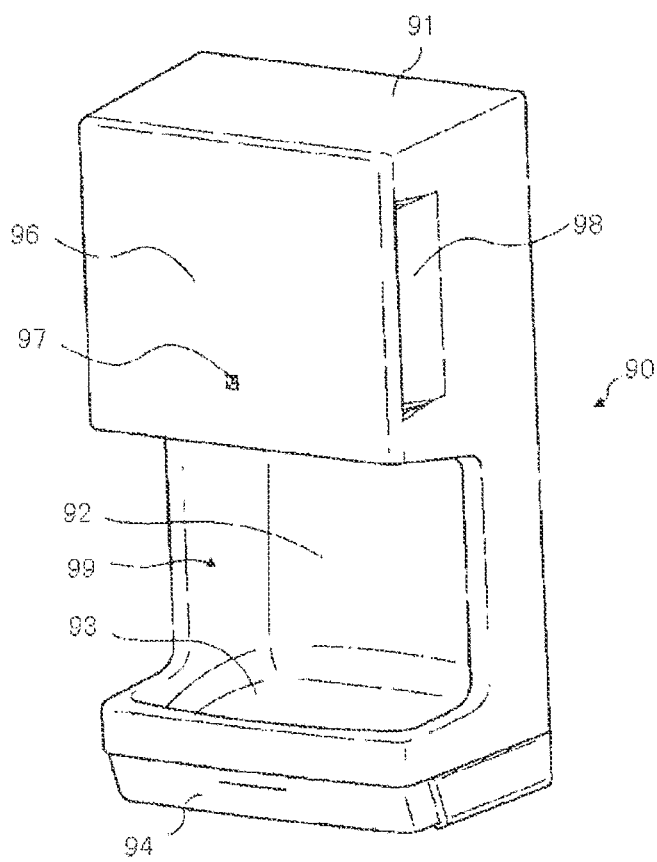
FIG. 10 is a perspective view of a hand dryer using the fan according to the fourth embodiment.

FIG. 10 is a perspective view illustrating an example of a configuration of a hand dryer 90 as another application example of the fan 30 in the fourth embodiment. The hand dryer 90 includes a casing 91, a hand detection sensor 92, a water catcher 93, a drain container 94, a cover 96, a sensor 97, and an air intake 98. Here, the sensor 97 is either a gyro sensor or a motion sensor. The hand dryer 90 has the fan 30 (not shown) in the casing 91. The hand dryer 90 is configured so that, when hands are inserted into a hand insertion portion 99 located above the water catcher 93, water is blown away from the hands by air blow of the fan, and then the water is received by the water catcher 93 and stored in the drain container 94.

As described above, the fan 30 according to the fourth embodiment is configured by the motor 10 using the rotor 1 or 20, and thus it is possible to obtain the fan which can be downsized and lightened and which vibrates little. Therefore, when the fan 30 is applied to a home appliance such as the electric vacuum cleaner 61 and the hand dryer 90, it is possible to provide a product which can be downsized and lightened and which vibrates little.

The configurations illustrated in the above embodiments are only examples of the contents of the present disclosure and can also be combined with other known arts. Part of the configurations can also be omitted or modified without departing from the scope of the present disclosure.

What is claimed is:
1. A rotor comprising:
a shaft extending in an axial direction;
a cylindrical magnet portion provided at an outer peripheral portion of the shaft;
a cylindrical scattering-prevention member provided so as to cover an outer peripheral surface of the magnet portion;
a first balancing member provided at one end of the magnet portion in the axial direction; and
a second balancing member provided at the other end of the magnet portion in the axial direction from which one end side of the shaft extends in the axial direction, the second balancing member having a diameter smaller than the inner diameter of the scattering-prevention member,
wherein the second balancing member has an end surface in contact with the magnet portion, the end surface being not surrounded by the scattering-prevention member.

2. A motor comprising:
a housing;
the rotor according to claim 1 accommodated in the housing so that one end side of the shaft protrudes from the housing;
a stator fixed to the housing and provided at an outer peripheral side of the rotor; and
first and second bearings fixed to the housing and rotatably supporting the shaft.

3. The motor according to claim 2, wherein the first bearing and the second bearing are provided on the one end side of the shaft protruding from the housing, the first bearing and the second bearing being arranged in this order from a side closer to the second balancing member, and
wherein a distance between the first bearing and the second bearing in an axial direction is larger than a distance between the first bearing and the second balancing member in the axial direction.

4. The motor according to claim 2, wherein the rotor is disposed so that an intermediate point of the stator in the axial direction is located closer to the first bearing than an intermediate point of the magnetic portion in the axial direction.

5. A fan comprising:
the motor according to claim 2;
a fan blade fixed to one end side of the shaft protruding from the housing; and
a fan casing fixed to the housing so as to enclose the fan blade.

6. An electric vacuum cleaner comprising the fan according to claim 5.

7. A hand dryer comprising the fan according to claim 5.

8. A rotor comprising:
a shaft extending in an axial direction;
a cylindrical magnet portion provided at an outer peripheral portion of the shaft;
a cylindrical scattering-prevention member provided so as to cover an outer peripheral surface of the magnet portion;
a first balancing member provided at one end of the magnet portion in the axial direction, the first balancing member having a diameter larger than an inner diameter of the scattering-prevention member;

a second balancing member provided at the other end of the magnet portion in the axial direction from which one end side of the shaft extends in the axial direction, the second balancing member having a diameter smaller than the inner diameter of the scattering-prevention member; and wherein a distance between an end surface of the first balancing member in contact with the magnet portion and an end surface of the second balancing member in contact with the magnet portion is larger than a length of the scattering-prevention member in the axial direction.

9. A motor comprising:

a housing;

the rotor according to claim 8 accommodated in the housing so that one end side of the shaft protrudes from the housing;

a stator fixed to the housing and provided at an outer peripheral side of the rotor; and first and second bearings fixed to the housing and rotatably supporting the shaft.

10. The motor according to claim 9, wherein the first bearing and the second bearing are provided on the one end side of the shaft protruding from the housing, the first bearing and the second bearing being arranged in this order from a side closer to the second balancing member, and wherein a distance between the first bearing and the second bearing in an axial direction is larger than a distance between the first bearing and the second balancing member in the axial direction.

11. The motor according to claim 9, wherein the rotor is disposed so that an intermediate point of the stator in the axial direction is located closer to the first bearing than an intermediate point of the magnetic portion in the axial direction.

12. A fan comprising:

the motor according to claim 9;

a fan blade fixed to one end side of the shaft protruding from the housing; and a fan casing fixed to the housing so as to enclose the fan blade.

13. An electric vacuum cleaner comprising the fan according to claim 12.

14. A hand dryer comprising the fan according to claim 12.

* * * * *